United States Patent [19]

Yasukawa et al.

[11] Patent Number: 4,525,208
[45] Date of Patent: Jun. 25, 1985

[54] METHOD FOR RECOVERY OF ZN AND PB FROM IRON AND STEEL DUST

[75] Inventors: Motohiro Yasukawa; Yukio Ishikawa; Yasuo Ojima; Hiromi Harada, all of Niihama; Yoshiaki Mori, Sendai, all of Japan

[73] Assignee: Sumitomo Metal Mining Company Limited, Tokyo, Japan

[21] Appl. No.: 631,763

[22] Filed: Jul. 17, 1984

[30] Foreign Application Priority Data

Jul. 26, 1983 [JP] Japan ................................ 58-137191

[51] Int. Cl.³ ............................................... C22B 7/02
[52] U.S. Cl. ........................................ 75/25; 75/77; 75/88; 75/63
[58] Field of Search ........................ 75/25, 88, 77, 63; 266/154, 157

[56] References Cited

U.S. PATENT DOCUMENTS

| 2,045,639 | 6/1936 | Eulenstein et al. | 266/145 |
| 4,209,322 | 6/1980 | Janssen et al. | 75/25 |
| 4,396,424 | 8/1983 | Yatsunami et al. | 75/25 |

Primary Examiner—Melvyn J. Andrews
Attorney, Agent, or Firm—Watson, Cole, Grindle & Watson

[57] ABSTRACT

A method of recovering Zn and Pb from iron and steel dust wherein the interior of a rotary smelting furnace connected to the discharge side of a rotary kiln is heated by a burner disposed on the outlet side of the rotary smelting furnace; a heating gas is introduced into the rotary kiln to subject the iron and steel dust containing Zn and Pb which was fed in the rotary kiln to a preliminary reduction with the aid of a reducing agent and, if required, a flux so as to volatilize Zn and Pb; and the product of the rotary kiln is fed into the rotary smelting furnace with addition of a flux to melt the resultant mixture and further volatilize Zn and Pb entrained in the product.

10 Claims, 1 Drawing Figure

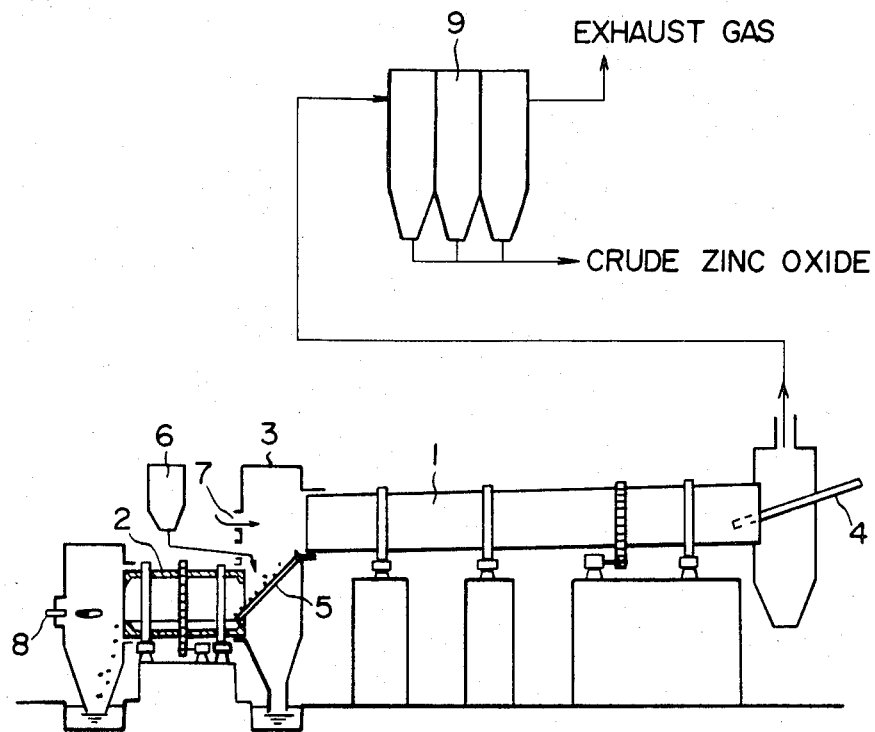

METHOD FOR RECOVERY OF ZN AND PB FROM IRON AND STEEL DUST

BACKGROUND OF THE INVENTION

1. Field of the Invention

This invention relates to a method for the recovery of Zn and Pb through volatilization from iron and steel dust.

2. Description of Prior Art

The iron and steel dust which occurs from an open-arc furnace and a blast furnace operated in the iron and steel industry contains Zn and Pb, as well as iron oxide. The industry has made an established rule to recover such Zn and Pb from the iron and steel dust. Heretofore, this recovery has been most popularly effected by the reducing roasting process represented by the Waelz kiln process, involving the use of an internally heated counterflow type rotary kiln. The reducing roasting method using this particular rotary kiln comprises roasting the iron and steel dust in a strongly reducing atmosphere under suitably selected conditions of temperature and retention time, thereby separating Zn and Pb through volatilization from the dust and enabling iron to be discharged in the form of ordinary solid, reduced iron pellets. However, it is extremely difficult to maintain the operation of this rotary kiln under appropriate conditions for a long time. In terms of the recovery of Zn and Pb through volatilization, this process is not amply satisfactory. Intensification of the reducing atmosphere and elevation of the roasting temperature are effective in heightening the ratio of volatilization of Zn, etc. If the reduction is carried out at a higher temperature, the component of low melting point is deposited in a fused state on the inner wall surface of the rotary kiln, giving rise to ring-shaped deposits and, consequently, impeding the continued operation of the rotary kiln. Since the elevation of temperature thus results in a decrease of the duration of practicable continued operation, there is a limit to the temperature elevation. As the result, the ratio of volatilization of Zn, etc., is inevitably reduced to some extent. As a measure to cope with this difficulty, the method which comprises adding a flux to the feed to the rotary kiln, thereby adjusting the melting point of the feed and enabling the feed to be completely melted within the rotary kiln, has found wide acceptance. By this method, the ratio of volatilization of Zn and Pb is satisfactorily high and the formation of deposits on the wall of the kiln is avoided in the region in which the feed is completely melted. This method, however, has the disadvantage that in the half-melted region in which the feed is in the process of being transformed from its solid state to its fused state, formation of deposits on the kiln wall occurs conspicuously and, consequently, the duration of continued kiln operation is extremely short.

The recovery of Zn and Pb from the iron and steel dust is otherwise effected by the slag fuming method which, by the use of a stationary furnace in the place of the rotary kiln, effects the desired volatilization of Zn, etc., by melting the iron and steel dust completely, as by electric heating and blowing air and a reducing agent such as coal or coke through a lance pipe into the molten iron and steel dust. This method has the disadvantage that, since the reduction, when carried out too strongly, produces metallic iron and offers obstacles to the furnace operation, the degree of the reduction is repressed to the extent of avoiding the formation of metallic iron and, consequently, the ratio of volatilization of Zn, etc., cannot be increased sufficiently.

SUMMARY OF THE INVENTION

This invention is aimed at providing a method which is free from the aforementioned disadvantages suffered by the conventional methods adopted for the recovery of Zn, Pb through volatilization and from the iron and steel dust and which enables the Zn and Pb to be recovered at a high ratio of volatilization without entailing formation of deposits on the furnace wall and consequent decrease of the duration of continued furnace operation.

The other objects and characteristics of this invention will become apparent from the further disclosure of this invention to be made in the following detail description of a preferred embodiment, with reference to the accompanying drawing.

BRIEF DESCRIPTION OF THE DRAWING

The drawing is a schematic representation of a typical apparatus to be used for accomplishing the method of this invention.

DESCRIPTION OF PREFERRED EMBODIMENT

To accoplish the object described above, this invention provides a method for the recovery of Zn and Pb from iron and steel dust, which method is characterized by heating the interior of a rotary smelting furnace connected to the discharge side of a rotary kiln by the use of a heating burner disposed on the outlet side of the rotary smelting furnace, then causing the feed to the rotary kiln and a heating gas to flow counter to each other within the rotary kiln, feeding into the rotary kiln the iron and steel dust entraining Zn and Pb and a reducing agent and, when necessary, a flux, thereby preliminarily reducing the iron and steel dust and volatilizing the entrained Zn and Pb, subsequently feeding the product of the rotary kiln continuously into the rotary smelting furnace and adding thereto a flux, and melting the resultant mixture under a reducing atmosphere and further volatilizing the Zn and Pb.

This invention improves the ratio of volatilization of Zn and Pb to a great extent and precludes the formation of deposits on the furnace wall and the consequent decrease of the duration of continued furnace operation by adopting the method which comprises first effecting preliminarily reduction of the iron and steel dust and volatilization of Zn and Pb in the rotary kiln at a temperature incapable of inducing formation of deposits on the furnace wall and then continuously feeding the product of the rotary kiln into the rotary smelting furnace connected to the rotary kiln and allowing the feed to be completely melted under a reducing atmosphere and further volatilization Zn and Pb.

A typical apparatus used for working this invention is schematically illustrated in the accompanying drawing. In the drawing, 1 stands for a rotary kiln and 2 for a rotary smelting furnace which is connected through the medium of a hood 3 to the rotary kiln 1. Denoted by 4 is a raw material feeding chute for delivering the feed to the rotary kiln 1. Denoted by 5 is a sharply inclined chute installed inside the hood of the rotary kiln for gravitationally feeding the product of the rotary kiln 1 to the rotary smelting furnace 2. A flux bin 6 is used for feeding a flux to the rotary smelting furnace 2 and an air feed inlet 7 is formed in the hood 3. On the outlet side of the rotary smelting furnace 2 is disposed a heating burner 8 such as a heavy oil burner. By 9 is denoted a dust collector. In the dust collector 9, the Zn and Pb volatilized in the rotary kiln 1 and the rotary smelting furnace 2 and entrained by the exhaust gas are recovered in the form of crude zinc oxide.

The rotary kiln 1 is charged with iron and steel dust and a reducing agent such as pulverized coke or coal. Generally, the feeding ratiio of the reducing agent is in the range of 20 to 40% by weight based on the iron and steel dust. A typical composition of the iron and steel dust fed to the rotary kiln 1 is shown in Table 1.

TABLE 1

|  | Zn | Pb | Fe | CaO | $SiO_2$ | C | MgO | $Al_2O_3$ |
|---|---|---|---|---|---|---|---|---|
| % by weight | 20~24 | 2~4 | 25~30 | 1~5 | 1~5 | 1~3 | 2~5 | 1~4 |

The iron and steel dust may be fed in the form of powder or it may be pelletized in advance and then fed in the form of pellets. When the iron and steel dust is pelletized, the pellets may be so prepared as to incorporate therein the whole or part of the reducing agent and promote the reaction of reduction advantageously. Addition of CaO results in promotion of the reduction of ZnO. Optionally, therefore, limestone or quick lime may be fed as a flux in conjunction with the iron and steel dust and the reducing agent. A $SiO_2$-containing substance such as silica is also fed as a flux to the rotary smelting furnace as described more fully afterward. Optionally, part of this substance may be fed in the rotary kiln. If this substance is added in a large amount, it has an effect of lowering the melting point of the charge under treatment and possibly induces formation of deposits on the inner wall surface of the rotary kiln. Thus, the addition of this substance should be made in an amount incapable of bringing about such trouble. A CO-containing gas of a high temperature emanating from the rotary smelting furnace is fed into the rotary kiln to heat the contents thereof and, with the aid of the reducing agent, effects preliminary reduction of the contents. In this case, to preclude the formation of deposits on the inner wall surface of the rotary kiln, the amount of air introduced through the air inlet 7 provided in the hood on the outlet side of the rotary kiln must be regulated so that the inner temperature of the rotary kiln will fall in the range of 800° to 1000° C., and not exceed 1000° C. The ratio of the Zn component which is volatilized within the rotary kiln is 60 to 70%. The product of the rotary kiln which contains the residual Zn and Pb is continuously fed through the chute 5 into the rotary smelting furnace 2.

In the rotary smelting furnace 2, the product of the rotary kiln is heated by the burner 8 to a temperature exceeding 1200° C. and falling within the range of 1200° to 1350° C. and, consequently, melted rapidly and completely. The reducing agent fed into the rotary kiln is not wholly used up in the preliminary reduction within the rotary kiln. The portion 60 to 70% of the reducing agent moves on and enters the rotary smelting furnace 2, undergoes a reaction therein to generate a large amount of CO to aid in thorough progress of the reduction and volatilization of Zn and Pb in the molten bath. The molten mass from which Zn and Pb have been expelled by volatilization is discharged as slag from the rotary smelting furnace via the outlet thereof. Into the rotary smelting furnace, the $SiO_2$-containing substance such as silica and, when necessary, the CaO-containing substance such as limestone or quick lime, are fed from the flux bin 6 for the purpose of promoting the melting of the product of the rotary kiln. The amount of the flux thus added is selected in the range in which the added flux brings about the effect of lowering the melting point of the product of the rotary kiln, and it is desired to be selected in the range in which the slag to be formed has viscosity enough not to be separated and settled even when the operating temperature happens to induce strong reduction and produce metallic iron. A typical desirable slag composition is shown in Table 2.

TABLE 2

| Total Fe | 35~45% by weight |
|---|---|
| (Metallic iron) | 25~35% by weight |
| CaO | 7~12% by weight |
| $SiO_2$ | 25~30% by weight |
| MgO | 3~5% by weight |
| $Al_2O_3$ | 3~4% by weight |
| Zn | 0.2~0.5% by weight |
| Pb | 0.1% by weight |
| $CaO/SiO_2$ | 0.2~0.4% by weight |

The amount of the air fed to the burner 8 for combustion therein is desired to be selected so that the ratio of excess air will be lowered as much as possible. Where no sufficient condition of reduction is obtained only with the reducing agent fed through the rotary kiln 1 to the rotary smelting furnace 2, the reducing agent may be fed directly to the rotary smelting furnace 2 to make up for the shortage of the supply of reducing agent. The Zn and Pb reduced and volatilized in the rotary smelting furnace 2 is guided in conjunction with the CO-containing gas generated therein to the rotary kiln and the exhaust gas from the rotary kiln is guided to the dust collector 9. Finally in the dust collector 9, they are recovered in conjunction with the Zn and Pb reduced and volatilized in the rotary kiln.

In accordance with the method of this invention for the recovery of Zn and Pb from the iron and steel dust as described in detail above, strong reduction is effected within the rotary smelting furnace at a high temperature enough to provide complete melting of the charge and the product of this reduction, even when the strong reduction happens to induce formation of metallic iron, is discharged as slag and is not allowed to form any factor for disturbing the furnace operation and, consequently, Zn and Pb are volatilized at an extremely high ratio. Further, inside the rotary kiln, since only preliminary reduction and volatilization is effected at a relatively low temperature, there is no possibility of the preliminary reduction forming deposits on the furnace wall and consequently decreasing the duration of continued furnace operation. In the reducing roasting method which only uses a rotary kiln and involves no melting, the volatilization ratio of Zn is 93.5% and that of Pb is 75.0% and the duration of continued furnace operation is about 40 days. In the method which effects the melting within a rotary kiln, the volatilization ratio of Zn is 98.0% and that of Pb is 96.4%, rather high values, and the duration of continued furnace operation is extremely short, falling on the order of 10 to 20 days. In the slag fuming method, while the duration of continued operation is long, the volatilization ratio of Zn and that of Pb are only 95.5% and 93.0%, respectively.

In contrast in the method of this invention, the volatilization ratio of Zn is 99.1% and that of Pb is 97.8%, notably high values, and the duration of continued furnace operation is long, falling in the neighborhood of 180 days. This means that the method of this invention is notably effective.

EXAMPLE 1

A rotary kiln 720 mm in inside diameter and 6000 mm in length and a rotary smelting furnace 1400 mm in inside diameter and 3882 mm in length provided on the outlet side thereof with a heavy oil burner were connected to each other through the medium of a hood and a sharply inclined chute incorporated in the hood as illustrated in the accompanying drawing. To the rotary kiln, iron and steel dust having a composition shown in Table 3 and powdered coke were fed as mixed at respective feed rates of 300 kg/h and 90 kg/h. Inside the rotary kiln, the high-temperature CO-containing gas introduced from the rotary smelting furnace and the air fed in at a regulated rate through the air inlet formed on the outlet side of the hood of the rotary kiln were mixed to control the inner temperature of the rotary kiln below 1000 C. to effect preliminary reduction, with the retention time fixed at 90 minutes. The product of the rotary kiln was continuously fed to the rotary smelting furnace having the inner temperature thereof kept at 1200° C. and, by the addition of silica at a feed rate of 40 kg/h, rapidly melted. Owing to the reduction with the coke introduced through the rotary kiln, Zn and Pb were substantially completely volatilized and the molten mass free from Zn and Pb was continuously discharged, in conjunction with the residual carbon, as slag from the rotary smelting furnace via the outlet side end thereof. The retention time within the rotary smelting furnace was fixed at 240 minutes. The operation could be continued for 180 days without any formation of deposit on the wall of the rotary kiln. The volatilization ratio of Zn was 99.1% and that of Pb was 97.8%.

TABLE 3

|  | Zn | Pb | Fe | CaO | $SiO_2$ | C |
|---|---|---|---|---|---|---|
| % by weight | 23.1 | 3.0 | 30.0 | 5.0 | 4.0 | 1.0 |

TABLE 4

|  |  | Zn | | Pb | | Fe | | CaO | | $SiO_2$ | | C | |
|---|---|---|---|---|---|---|---|---|---|---|---|---|---|
|  | kg/h | % | kg/h | % | kg/h | % | kg/h | % | kg/h | % | kg/h | % | kg/h |
| Iron and steel dust | 300 | 23.1 | 69.3 | 3.0 | 9 | 30.0 | 90 | 5.0 | 15 | 4.0 | 12 | 1.0 | 3 |
| Coke | 90 | | | | | | | | | 4.0 | 3.6 | 88 | 79.2 |
| Silica | 40 | | | | | | | | | 90 | 36 | | |
| Total charge | 430 | | 69.3 | | 9 | | 90 | | 15 | | 51.6 | | 82.2 |
| Crude zinc oxide | 125 | 55 | 68.7 | 7.0 | 8.8 | 2.5 | 3.1 | 1.0 | 1.3 | 1.0 | 1.3 | 2.0 | 2.5 |
| Slag | 195 | 0.3 | 0.6 | 0.1 | 0.2 | 44.6 | 86.9 | 7.0 | 13.7 | 25.3 | 49.3 | 1.5 | 2.9 |
|  |  |  |  |  |  | Metallic Fe | | | | | | | |
|  |  |  |  |  |  | (31) | (60.5) | | | | | | |
| Residual carbon | 25 | | | | | | | | | 4.0 | 1 | 88 | 22 |
| Exhaust gas | 1350 $Nm^3h$ | | | | | | | | | | | C in CO + $CO_2$ | 54.8 |
| Total | | | 69.3 | | 9 | | 90 | | 15 | | 51.6 | | 82.2 |

EXAMPLE 2

In the same apparatus as used in Example 1, having a rotary kiln and a rotary smelting furnace connected to each other, iron and steel dust of the same composition as involved in Example 1, powdered coke, limestone, and silica were fed to the rotary kiln at respective feed rates of 300 kg/h, 90 kg/hr, 20 kg/h, and 20 kg/h. Within the rotary kiln, the high-temperature CO-containing gas introduced from the rotary smelting furnace and the air fed at a regulated rate through the air inlet of the outlet side hood of the rotary kiln were mixed to effect preliminary reduction, with the inner temperature of the rotary kiln kept below 1000° C. and the retention time at 90 minutes. The product of the rotary kiln was continuously fed to the rotary smelting furnace having the inner temperature thereof kept at 1200° C. and, by addition of silica at a feed rate of 30 kg/h, rapidly melted. Owing to the reduction with the coke fed in through the rotary kiln, Zn and Pb were substantially completely volatilized and the molten mass free from Zn and Pb was continuously discharged, in conjunction with the residual carbon, as slag from the rotary smelting furnace through the outlet side end. The retention time within the rotary smelting furnace was kept at 240 minutes. The operation could be continued for 180 days without any formation of deposit on the wall surface of the rotary kiln. The volatilization ratio of Zn was 99.1% and that of Pb was 97.8%. The mass balance was as shown in Table 5.

TABLE 5

|  |  | Zn | | Pb | | Fe | | CaO | | $SiO_2$ | | C | |
|---|---|---|---|---|---|---|---|---|---|---|---|---|---|
|  | kg/h | % | kg/h | % | kg/h | % | kg/h | % | kg/h | % | kg/h | % | kg/h |
| Iron and steel dust | 300 | 23.1 | 69.3 | 3.0 | 9 | 30.0 | 90 | 5.0 | 15 | 4.0 | 12 | 1.0 | 3 |
| Coke | 90 | | | | | | | | | 4.0 | 3.6 | 88 | 79.2 |
| Limestone | 20 | | | | | | | 55 | 11 | | | | |
| Silica | 50 | | | | | | | | | 90 | 45 | | |
| Total charge | 460 | | 69.3 | | 9 | | 90 | | 26 | | 60.0 | | 82.2 |
| Crude zinc oxide | 125 | 55 | 68.7 | 7.0 | 8.8 | 3.6 | 4.5 | 1.0 | 1.3 | 2.4 | 3.0 | 2.0 | 2.5 |
| Slag | 204 | 0.3 | 0.6 | 0.1 | 0.2 | 41.9 | 85.5 | 12.1 | 24.7 | 27.8 | 56.8 | 1.5 | 3.0 |
|  |  |  |  |  |  | Metallic Fe | | | | | | | |
|  |  |  |  |  |  | (30.0) | (61.2) | | | | | | |
| Residual carbon | 20 | | | | | | | | | 4.0 | 0.8 | 88 | 17.6 |
| Exhaust gas | 1350 $Nm^3h$ | | | | | | | | | | | C in CO + $CO_2$ | 59.1 |
| Total | | | 69.3 | | 9 | | 90 | | 26 | | 60.6 | | 82.2 |

The mass balance involved is shown in Table 4.

What is claimed is:

1. A continuous method of recovering zinc and lead from iron and steel dust using an apparatus which includes a rotary kiln, a dust collector, means connecting the dust collector to the rotary kiln, a rotary smelting furnace, means connecting the rotary smelting furnace to the rotary kiln, and heating means located near the rotary smelting furnace, the method comprising the steps of continuously
    (a) heating the interior of the rotary smelting furnace with the heating means,
    (b) maintaining the temperature within said rotary smelting furnace at 1200° to 1350° C.,
    (c) introducing a heated gas into the rotary kiln,
    (d) maintaining the temperature within the rotary kiln at 800° to 1000° C.,
    (e) adding a reducing agent to the rotary kiln,
    (f) adding iron and steel dust with entrained zinc and lead to the rotary kiln so as to form a partially-reduced mass and an exhaust gas containing volatilized zinc and lead,
    (g) passing the exhaust gas containing volatilized zinc and lead from the rotary kiln to the dust collector where the zinc and lead are recovered from the exhaust gas,
    (h) conveying the partially-reduced mass from the rotary kiln to the rotary smelting furnace,
    (i) adding a flux to the partially-reduced mass to form a mixture,
    (j) exposing the mixture of step (i) to a reducing atmosphere so as to melt the mixture, thereby effecting volatilization of the zinc and lead retained in the partially-reduced mass, and
    (k) discharging the molten mixture of step (j) from the rotary smelting furnace.

2. The method as defined in claim 1, wherein in step (i) said flux is added to the rotary kiln.

3. The method as defined in claim 1, wherein said flux is a substance which contains $SiO_2$.

4. The method as defined in claim 1, wherein said flux is limestone or quick lime.

5. The method as defined in claim 1, wherein said flux is a substance which contains CaO.

6. The method as defined in claim 5, wherein said flux is limestone or quick lime.

7. The method as defined in claim 1, wherein the temperature within the rotary kiln is maintained at 800° to 1000° C. in step (d) by adding a controlled amount of air to the rotary kiln.

8. The method as defined in claim 1, wherein the step (f) the iron and steel dust with entrained zinc and lead is added to the rotary kiln in powder form.

9. The method as defined in claim 1, wherein in step (f) the iron and steel dust with entrained zinc and lead is added to the rotary kiln in pellet form.

10. The method as defined in claim 1, wherein steps (e) and (f) are accomplished simultaneously by adding pellets to the rotary kiln containing the reducing agent and the iron and steel dust with entrained zinc and lead.

* * * * *